(12) United States Patent
Fillmore

(10) Patent No.: US 6,673,295 B1
(45) Date of Patent: *Jan. 6, 2004

(54) METHOD OF MAKING A DISPENSING CLOSURE

(75) Inventor: William E. Fillmore, Toledo, OH (US)

(73) Assignee: Owens-Illinois Closure Inc., Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/152,925

(22) Filed: Sep. 14, 1998

Related U.S. Application Data

(62) Division of application No. 08/746,521, filed on Nov. 12, 1996, now Pat. No. 5,927,567.

(51) Int. Cl.[7] ............................................. B29C 43/18
(52) U.S. Cl. ....................... 264/268; 264/275; 264/320; 425/127
(58) Field of Search ................................. 222/212, 215, 222/490, 491, 492, 493, 494, 568; 264/238, 268, 275, 320; 425/127

(56) References Cited

U.S. PATENT DOCUMENTS 1,206,661 A 11/1916 Booth
1,989,714 A 2/1935 Statham (List continued on next page.)

FOREIGN PATENT DOCUMENTS

| DE | 2704164 | 8/1978 |
| DE | 3531783 A | 3/1987 |
| DE | 9307083 U1 | 9/1993 |
| DE | 4315697 C1 | 7/1994 |
| DE | 29508151 U1 | 8/1995 |
| DE | 19533184 A1 | 9/1995 |

(List continued on next page.)

*Primary Examiner*—Edmund H. Lee

(57) ABSTRACT

A dispensing closure including a compression molded plastic closure having a base wall and a peripheral skirt having threads for engaging a container. An opening is formed in the base wall and a compression molded liner is molded in situ in the closure and includes a radial liner forming portion on the inner surface of the base wall of the closure. An integral nozzle is compression molded with the liner and extends axially through the opening in the base wall. One or more slits in the nozzle define a dispensing opening through which the contents of the container can be dispensed by squeezing the container. In another form, the dispensing closure is provided with a liner such that a syringe needle is used to penetrate an elastomeric wall for removal of the liquid contents of the package.

4 Claims, 5 Drawing Sheets

U.S. PATENT DOCUMENTS

| | | |
|---|---|---|
| 2,175,052 A | 10/1939 | Bull et al. |
| 2,646,063 A | 7/1953 | Hayes |
| 2,655,279 A * | 10/1953 | Wolf .......................... 215/11 |
| 2,684,789 A | 7/1954 | Marchant |
| 2,733,843 A | 2/1956 | Scroko |
| 2,785,841 A | 3/1957 | Westgate |
| 3,276,115 A | 10/1966 | Hansz |
| 3,281,000 A | 10/1966 | Lowen |
| 3,283,481 A | 11/1966 | Studley et al. |
| 3,289,874 A | 12/1966 | Dailey et al. |
| 3,342,379 A | 9/1967 | Foley |
| 3,490,488 A | 1/1970 | Grist |
| 3,613,223 A | 10/1971 | Bush |
| 3,618,825 A | 11/1971 | Clarke |
| 3,669,323 A | 6/1972 | Harker et al. |
| 3,762,170 A | 10/1973 | Fitzhugh |
| 3,927,796 A | 12/1975 | Whitehouse |
| 4,133,457 A | 1/1979 | Klassen |
| 4,166,553 A | 9/1979 | Fraterrigo |
| 4,171,561 A | 10/1979 | Bainard et al. |
| 4,224,275 A | 9/1980 | Sauer |
| 4,230,230 A | 10/1980 | Mumford |
| 4,312,824 A | 1/1982 | Mori et al. |
| 4,314,658 A | 2/1982 | Laauwe |
| 4,334,638 A | 6/1982 | Stock |
| 4,406,847 A | 9/1983 | O'Neal et al. |
| 4,408,702 A | 10/1983 | Horvath |
| 4,421,705 A | 12/1983 | Hatakeyama et al. |
| 4,434,810 A | 3/1984 | Atkinson |
| 4,470,523 A | 9/1984 | Spector |
| 4,728,006 A | 3/1988 | Drobish et al. |
| 4,749,108 A | 6/1988 | Dornsbusch et al. |
| 4,830,205 A | 5/1989 | Hammond et al. |
| 4,851,176 A | 7/1989 | Christiansen et al. |
| 4,867,926 A | 9/1989 | Matsushima |
| 4,969,581 A | 11/1990 | Seifert et al. |
| 4,987,740 A | 1/1991 | Colemen |
| 4,991,745 A | 2/1991 | Brown |
| 5,005,737 A | 4/1991 | Rohr |
| 5,012,956 A | 5/1991 | Stoody |
| 5,033,647 A | 7/1991 | Smith et al. |
| 5,033,655 A | 7/1991 | Brown |
| 5,071,017 A | 12/1991 | Stull |
| 5,105,985 A | 4/1992 | Kroeber |
| 5,115,950 A | 5/1992 | Rohr |
| 5,213,236 A | 5/1993 | Brown et al. |
| 5,234,138 A | 8/1993 | De Laforcade |
| 5,261,459 A | 11/1993 | Atkinson et al. |
| 5,271,531 A | 12/1993 | Rohr et al. |
| 5,307,955 A | 5/1994 | Viegas |
| 5,325,999 A | 7/1994 | Gueret |
| 5,339,995 A | 8/1994 | Brown et al. |
| 5,360,145 A | 11/1994 | Gueret |
| 5,377,877 A | 1/1995 | Brown et al. |
| 5,390,805 A | 2/1995 | Bilani et al. |
| 5,409,144 A | 4/1995 | Brown |
| 5,531,363 A | 7/1996 | Gross et al. |
| 5,927,567 A * | 7/1999 | Filmore ..................... 222/490 |

FOREIGN PATENT DOCUMENTS

| | | |
|---|---|---|
| DE | 29508949 U1 | 9/1995 |
| DE | 4417569 A1 | 1/1996 |
| DE | 4440211 C1 | 2/1996 |
| DE | 29603364 U1 | 5/1996 |
| DE | 19633472 A1 | 3/1997 |
| EP | 209223 A1 | 2/1986 |
| EP | 219931 | 4/1987 |
| EP | 232571 | 8/1987 |
| EP | 242253 A | 10/1987 |
| EP | 253495 | 1/1988 |
| EP | 257880 A1 | 3/1988 |
| EP | 275836 A1 | 7/1988 |
| EP | 287530 A2 | 10/1988 |
| EP | 263772 A1 | 12/1988 |
| EP | 380204 A1 | 8/1990 |
| EP | 395380 A2 | 10/1990 |
| EP | 405472 A1 | 1/1991 |
| EP | 442379 | 8/1991 |
| EP | 442857 A1 | 8/1991 |
| EP | 452260 A1 | 10/1991 |
| EP | 455431 A1 | 11/1991 |
| EP | 463658 A1 | 1/1992 |
| EP | 495435 A1 | 7/1992 |
| EP | 495440 A2 | 7/1992 |
| EP | 281529 B1 | 5/1993 |
| EP | 546817 A1 | 6/1993 |
| EP | 0545678 A2 | 9/1993 |
| EP | 0743259 A1 | 11/1996 |
| FR | 2690139 | 10/1993 |
| GB | 2166121 A | 4/1986 |
| GB | 2208290 A | 3/1989 |
| GB | 2252734 A | 8/1992 |
| GB | 2260535 A | 4/1993 |
| GB | 2297959 A | 8/1996 |
| WO | 599 | 1/1987 |
| WO | 4244 | 3/1992 |
| WO | 3858 | 3/1993 |
| WO | 13992 | 7/1993 |
| WO | 5552 | 3/1994 |
| WO | 13546 | 6/1994 |
| WO | 14675 | 7/1994 |
| WO | 17712 | 8/1994 |
| WO | 21098 | 8/1995 |
| WO | 34500 | 12/1995 |
| WO | 01215 | 1/1996 |

* cited by examiner

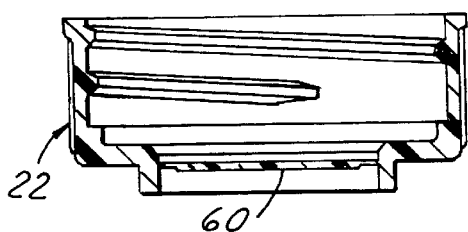
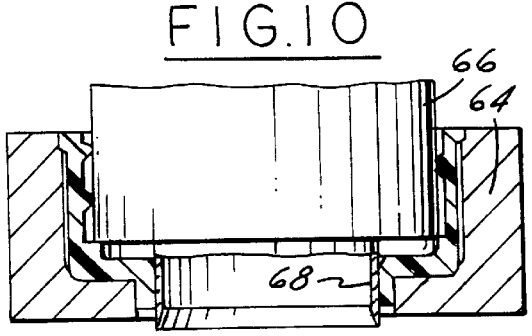
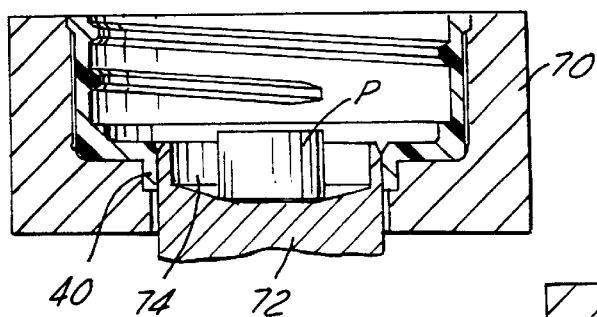
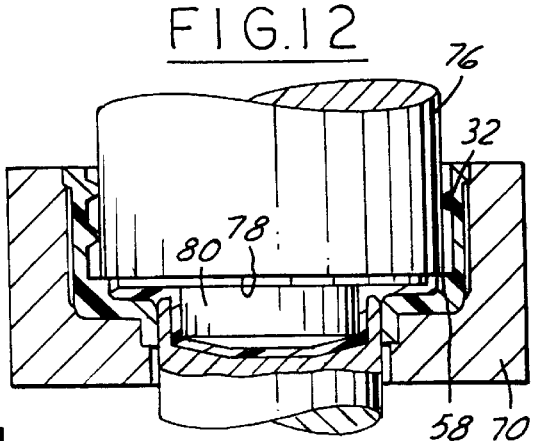
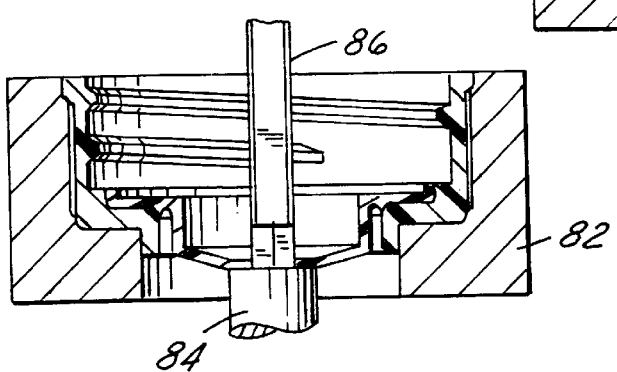

METHOD OF MAKING A DISPENSING CLOSURE

This application is a division of application Ser. No. 08/746,521 filed Nov. 12, 1996, now U.S. Pat. No. 5,927,567.

This invention relates to dispensing closures and a method making such closures.

BACKGROUND AND SUMMARY OF THE INVENTION

In dispensing closures, it is common to form a closure with an opening and insert a resilient nozzle in the closure. Such a closure requires the separate manufacture of each of these components as well as associated components for retaining the nozzle.

Among the objectives of the present invention are to provide a dispensing closure that requires only two components, namely, a closure and a combined liner and nozzle; which dispensing closure is made by compression molding a closure and thereafter compression molding a charge of plastic in the closure to form the combined closure, liner and nozzle; wherein the method involves a minimum number of steps; and wherein the control of the tolerances of the dispensing closure is made easier.

In accordance with the invention, the dispensing closure comprises a plastic closure having a base wall and a peripheral skirt is compression molded and has threads for engaging a container. A compression molded liner is formed in situ in the closure and includes a radial liner forming portion on the inner surface of the base wall of the closure. An integral nozzle is compression molded with the liner and extends axially through the opening in the base wall. One or more slits in the nozzle define a dispensing opening through which the contents of the container can be dispensed by squeezing the container. The invention is also applicable to making a closure for a package wherein a syringe needle is used to penetrate an elastomeric wall for removal of the liquid contents of the package.

BRIEF DESCRIPTION OF THE DRAWINGS

FIG. 9 is an inverted view of the plastic closure portion after it has been compression molded.

FIG. 10 is a sectional view of an apparatus for trimming the cull formed in the plastic closure portion to form an opening through the plastic closure portion.

FIG. 11 is a sectional view of an apparatus for compression molding a charge of plastic in place in the plastic closure.

FIG. 12 is a sectional view of an apparatus for compression molding the charge in the plastic closure to define a combined liner and nozzle in the plastic closure.

FIG. 13 is a sectional view of an apparatus for slitting the nozzle to define a dispensing closure.

DESCRIPTION OF THE PREFERRED EMBODIMENTS

Figure 1:
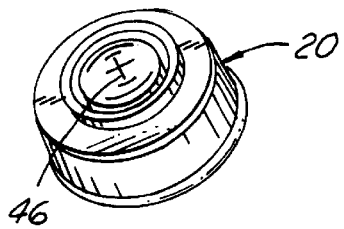
FIG. 1 is a perspective view of the dispensing closure embodying the invention.
Figure 2:
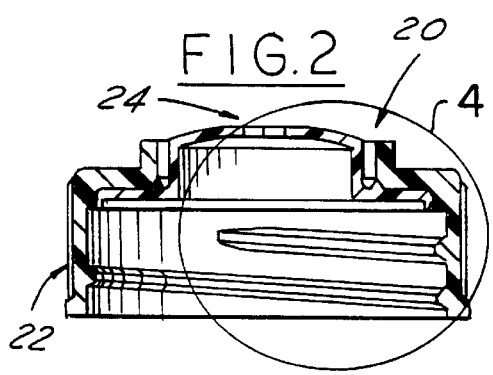
FIG. 2 is a vertical sectional view of the dispensing closure.

Referring to FIGS. 1–4, in accordance with the invention, the dispensing closure 20 embodying the invention comprises a compression molded plastic closure 22 and a combined liner and nozzle 24 compression molded in place in the plastic closure 22. The plastic closure 22 comprises a base wall 26 having an opening 28 therein and an integral peripheral skirt 30. The skirt 30 includes means on the inner surface thereof for engaging complementary means on a squeezable plastic container, the means herein shown comprising threads 32. The plastic closure is made of plastic such as polypropylene. The combined liner and nozzle 24 is made of highly resilient elastomeric material.

Figure 4:
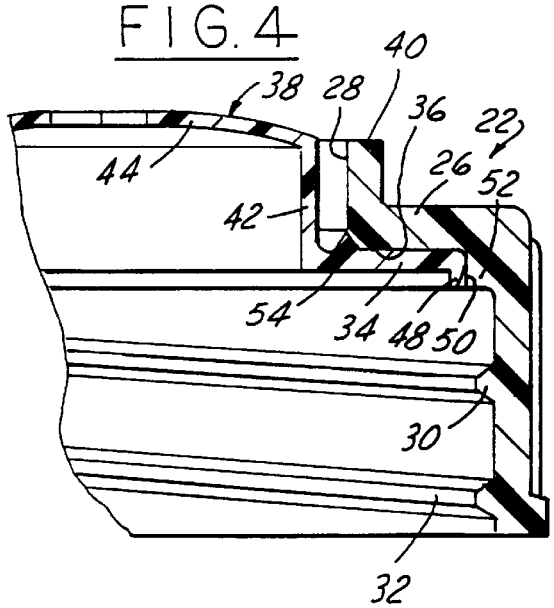
FIG. 4 is a fragmentary sectional view on an enlarged scale of the dispensing closure shown in FIG. 2.
Figure 3:
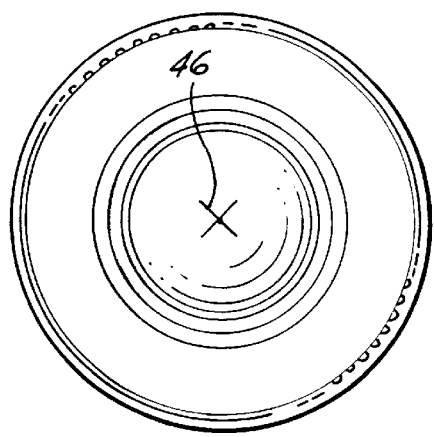
FIG. 3 is a top plan view of the dispensing closure.
Figure 5:
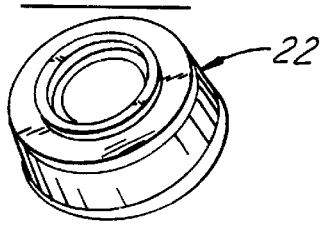
FIG. 5 is a perspective view of the plastic closure portion of the dispensing closure.
Figure 6:
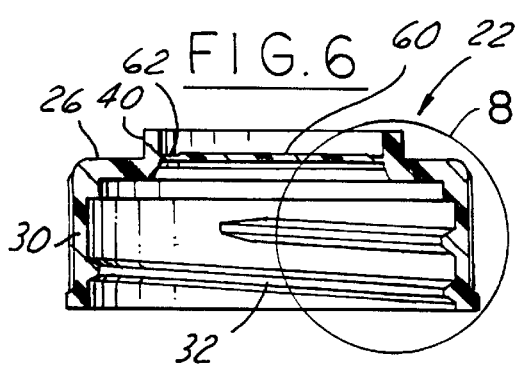
FIG. 6 is a vertical sectional view of the plastic closure portion after it has been compression molded.
Figure 8:
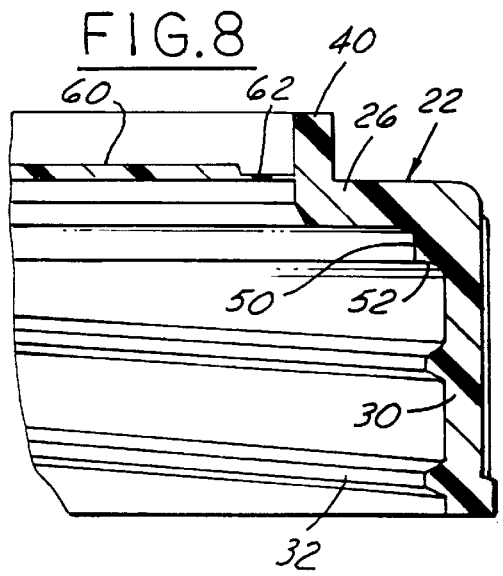
FIG. 8 is a fragmentary sectional view on an enlarged scale of the plastic closure portion shown in FIG. 6.
Figure 7:
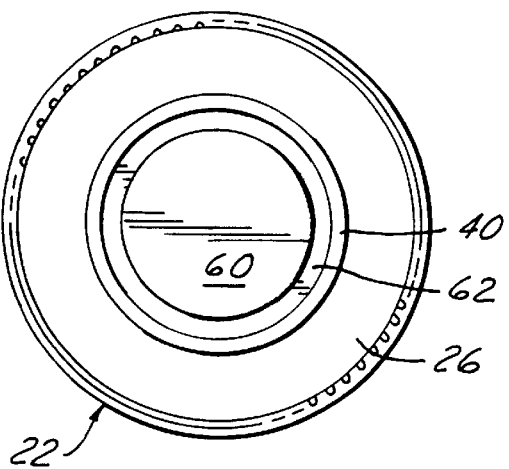
FIG. 7 is a top plan view of the plastic closure portion shown in FIG. 6.
Figure 14:
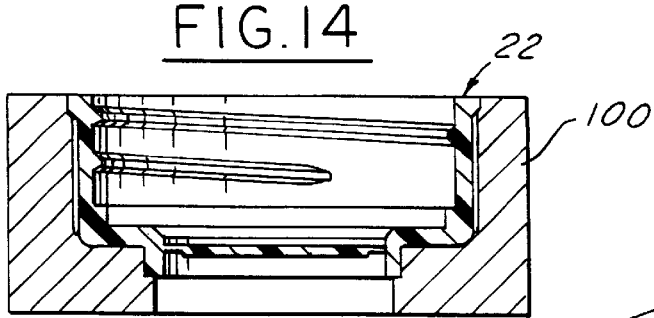
FIG. 14 is an inverted view of a closure in a holder.
Figure 15:
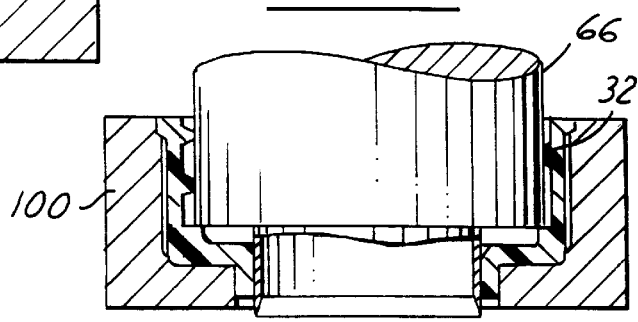
FIG. 15 is a sectional view of a modified form of an apparatus for trimming the cull from a plastic closure portion shown in FIG. 14.
Figure 16:
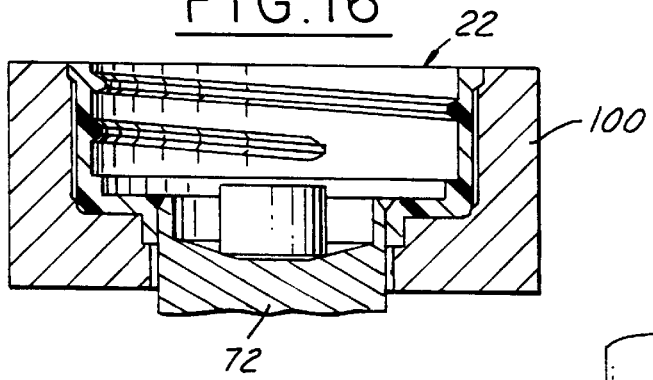
FIG. 16 is a sectional view of a modified apparatus for molding a charge of plastic in place in the plastic closure.
Figure 17:
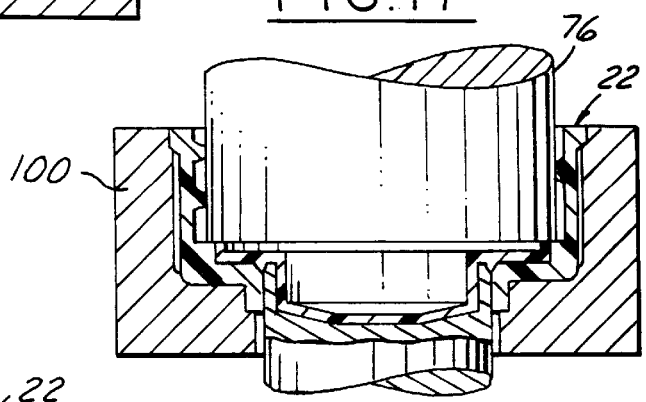
FIG. 17 is a sectional view of a modified apparatus for compression molding the charge shown in FIG. 16.

The combined liner and nozzle comprises an annular liner portion 34 engaging the inner surface 36 of the base wall 26 of the plastic closure 22. The combined liner and nozzle 24 includes an integral nozzle portion 38 which extends axially through the opening 28 in spaced relation to a cylindrical annular axial portion 40 which defines the opening in the plastic closure 22. Nozzle portion 38 includes an integral axial wall 42 extending from the liner portion 34 and an integral convex dome portion 44 having one or more slits 46 therethrough which open upon squeezing the container on which the dispensing closure 20 is positioned. As shown in FIG. 4, the liner portion 34 preferably includes an integral peripheral axial portion 48 extending along a short cylindrical portion 50 on a shoulder 52 at the juncture of the base wall 26 and skirt 30. In addition, the liner portion 34 preferably includes an integral annular bead 54 on the upper surface thereof which engages a complementary surface at the juncture of the axial portion 40 and base wall 26.

In accordance with the invention, the dispensing closure is made by first compression molding the closure 22 and thereafter compression molding the combined liner and dispensing nozzle 24 in the closure 22. In order to simplify the method of manufacture, the plastic closure 22 is formed with an integral disk or cull 60 connected to the base wall 26 by a thin annular web 62 (FIGS. 5–8).

Referring to FIGS. 9 and 10, the disk 60 is removed by inverting the plastic closure 22 and placing it in a holder 64 which holds the plastic closure 22 in position for moving a cutting tool 66 having an annular cutting edge 68 for severing the disk 60 and web 62 from the remainder of the closure 22.

Referring to FIGS. 11 and 12, the plastic closure 22 is then placed in a holder 70 for receiving the closure 22 which includes a tool 72 extending into the axial portion 40 and defining a cavity 74 for receiving a charge of molten plastic P. A compression molding tool 76 is then moved axially into the apparatus 70 to compression mold the combined liner and nozzle 24. The periphery of the tool 76 engages the threads 32 on the closure 22 and the shoulder 52 to close the cavity 74. The end of the tool 76 is configured with an annular surface 78 for forming the liner portion and an axial portion 80 for forming the nozzle portion. Referring to FIG. 13, the dispensing closure is then placed in a holder 82 where a base tool 84 contacts the nozzle portion and a cutting tool 86 is moved axially to cut one or more slits 46 in the nozzle portion.

In a preferred mode, as shown in FIGS. 14–18, a single holder 100 is provided and after the closure 22 is compression molded, it is used as a holder for the compression molded closure in performing the successive steps of severing the disc, compression molding the combined liner and nozzle 24 in the closure and forming the slits 46. Preferably, the holder 100 is one of a plurality of holders moved in an endless path, as by mounting on rotating turret which is moved past adjacent successive stations including a disc severing station; compression molding station for forming the liner and nozzle and a slitting station.

The compression molding is preferably by the method and apparatus described in U.S. patent application Ser. No. 08/135,829 filed Oct. 14, 1993, and Ser. No. 08/135,828 incorporated herein by reference filed Oct. 14, 1993.

Figure 18:
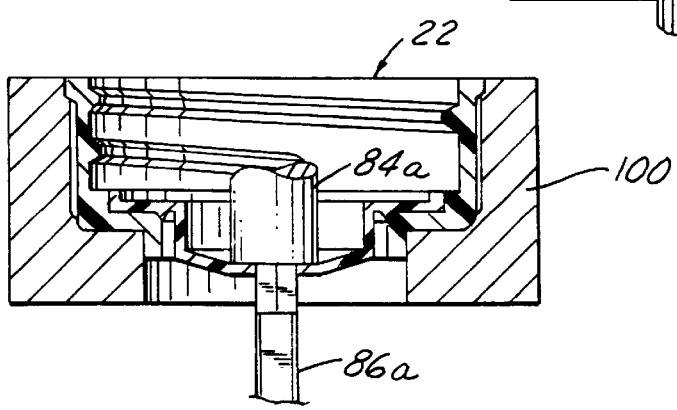
FIG. 18 is a sectional view of a modified form of apparatus for slitting the nozzle.
Figure 20:
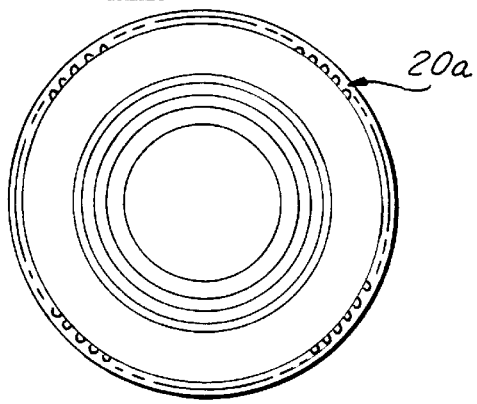
FIG. 20 is a top plan view of the closure shown in FIG. 19.
Figure 21:
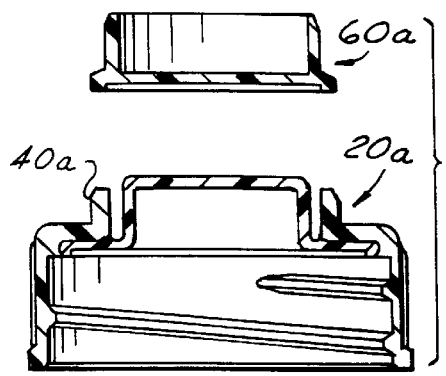
FIG. 21 is a sectional exploded view of the closure after the top section is severed.
Figure 19:
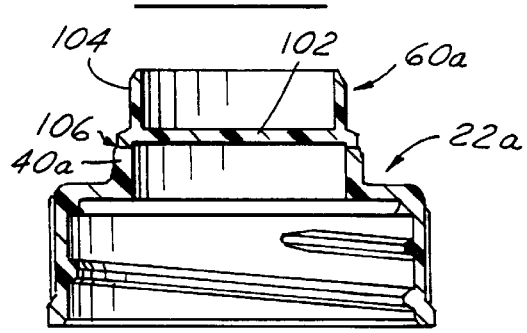
FIG. 19 is a sectional view of a modified form of closure before forming a liner therein.
Figure 22:
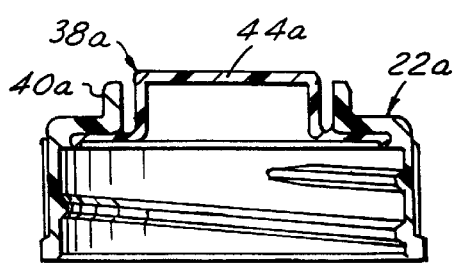
FIG. 22 is a sectional view of the closure with the liner compression molded in the closure.
Figure 23:
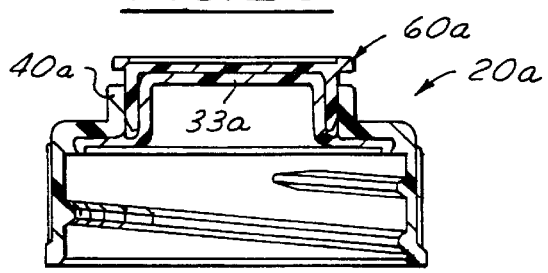
FIG. 23 is a sectional view of the closure and liner shown in FIG. 22 with the top section inverted and positioned to form a cap over the liner.

Referring to FIGS. 13 and 18, the tool 84 and cutting tool 86 can be reversed such that the cutting tool 86a is moved upwardly rather than downwardly and tool 84a is stationary.

In a modified form shown in FIGS. 19–23, the closure 22a is molded with top section 60a that comprises a base wall 102 and an integral wall 104 molded integrally with the cylindrical axial portion 40a. A weakened line 106 is formed and extends circumferentially at the juncture of the wall 102 and axial portion 40a. The top section 60a is severed from the closure 22a along weakened line 106 separating the wall 102 from axial wall portion 40a. The liner and nozzle 44a is compression molded as described above. The top section 60a can be inverted and used as a cap (FIG. 23) with the cylindrical wall 104 extending into the space between the axial wall portion 40a and the liner and the base wall 102 engaging the upper wall 44a of the liner 24a.

Figure 24:
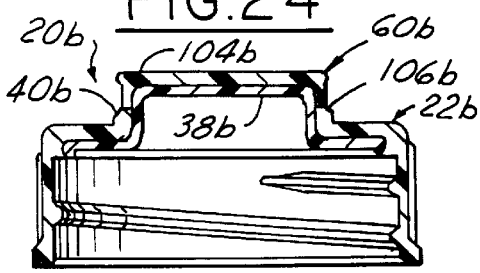
FIG. 24 is a sectional view of a modified form of closure and liner which includes a removable top section.

In the modified form shown in FIG. 24, the dispensing closure 20b includes a plastic closure 22b which has a shortened axial wall portion 40b connected by a weakened line 106b to the cylindrical wall 104b of the top section 60b, such that upon severing by the user, the top section 60b it can be used as a removable cap.

Although the invention has been described as being directed to making a dispensing closure, it is also applicable to making a closure for a package wherein a syringe needle is used to penetrate an elastomeric wall for removal of the liquid contents of the package.

It can thus be seen that there has been provided a dispensing closure comprises a plastic closure having a base wall with an opening therethrough and a peripheral skirt having means such as threads for engaging a container. A compression molded liner is formed in situ in the closure and includes a radial liner forming portion on the inner surface of the base wall of the closure. An integral nozzle is compression molded with the liner and extends axially through the opening in the base wall. One or more slits in the nozzle define a dispensing opening through which the contents of the container can be dispensed by squeezing the container. The invention is also applicable to making a closure for a package wherein a syringe needle is used to penetrate an elastomeric wall for removal of the liquid contents of the package.

What is claimed is:

1. A method of making a dispensing closure that comprises the steps of:

(a) providing a plastic closure having a base wall with a central opening surrounded by an annular wall that extends axially outwardly from said base wall, and a peripheral skirt that extends from said base wall oppositely of said annular wall, and (b) compression molding a combined liner and nozzle of resilient plastic material in situ within said closure such that said combined liner and nozzle has a transverse portion that engages said closure base wall within said skirt, an annular axial portion that extends into said opening within said annular wall, and a dispensing opening in said annular axial portion.

2. The method set forth in claim 1 wherein said step (b) is such that an axially oriented face of said transverse portion of said combined liner and nozzle engages an axially oriented undersurface of said closure base wall, and a radially outwardly oriented face of said transverse portion extends along a radially inwardly oriented surface of said closure.

3. The method set forth in claim 2 wherein at least part of said annular axial portion of said combined linear and nozzle is spaced radially inwardly from said annular wall within said annular wall and is unsecured to said annular wall.

4. The method set forth in claim 2 wherein said closure base wall, said transverse portion of said combined linear and, nozzle, said undersurface and said axially oriented face are all flat.

\* \* \* \* \*